United States Patent
Want et al.

(10) Patent No.: US 9,203,476 B2
(45) Date of Patent: Dec. 1, 2015

(54) SYSTEM AND METHOD FOR CODE COMMUNICATION

(71) Applicant: Google Inc., Mountain View, CA (US)

(72) Inventors: Roy Want, Mountain View, CA (US); William Noah Schilit, Mountain View, CA (US); Sean Keenan, Mountain View, CA (US)

(73) Assignee: Google Inc., Mountain View, CA (US)

( * ) Notice: Subject to any disclaimer, the term of this patent is extended or adjusted under 35 U.S.C. 154(b) by 316 days.

(21) Appl. No.: 13/840,229

(22) Filed: Mar. 15, 2013

(65) Prior Publication Data
US 2014/0273826 A1    Sep. 18, 2014

(51) Int. Cl.
| | |
|---|---|
| H04B 7/00 | (2006.01) |
| H04B 5/00 | (2006.01) |
| G01C 17/00 | (2006.01) |
| H04W 12/06 | (2009.01) |
| H04L 29/06 | (2006.01) |
| H04W 12/04 | (2009.01) |
| H04W 84/18 | (2009.01) |
| H04W 4/00 | (2009.01) |

(52) U.S. Cl.
CPC .............. *H04B 5/0056* (2013.01); *G01C 17/00* (2013.01); *H04W 12/06* (2013.01); *H04L 63/18* (2013.01); *H04W 4/008* (2013.01); *H04W 12/04* (2013.01); *H04W 84/18* (2013.01)

(58) Field of Classification Search
USPC ......... 455/456.1–457, 404.2, 41.1–41.3, 410, 455/411
See application file for complete search history.

(56) References Cited

U.S. PATENT DOCUMENTS

| | | | | |
|---|---|---|---|---|
| 6,563,423 | B2 * | 5/2003 | Smith | 340/572.1 |
| 7,532,901 | B1 * | 5/2009 | LaFranchise et al. | 455/456.6 |
| 8,406,810 | B1 * | 3/2013 | Kamal et al. | 455/558 |
| 8,884,738 | B2 * | 11/2014 | Spangenberg et al. | 340/5.2 |
| 2002/0121979 | A1 * | 9/2002 | Smith | 340/572.1 |
| 2005/0173539 | A1 * | 8/2005 | Gielis | 235/462.25 |
| 2005/0219962 | A1 * | 10/2005 | Ollila | 369/13.11 |
| 2006/0079180 | A1 * | 4/2006 | Sinivaara | 455/41.2 |

(Continued)

FOREIGN PATENT DOCUMENTS

| | | |
|---|---|---|
| DE | 102010043394 A1 | 5/2012 |
| WO | 2011134655 A1 | 11/2011 |

OTHER PUBLICATIONS

International Search Report mailed Sep. 11, 2014 in Application No. PCT/US2014/023959.

*Primary Examiner* — Edward Urban
*Assistant Examiner* — Rui Hu
(74) *Attorney, Agent, or Firm* — Morris & Kamlay LLP

(57) ABSTRACT

Systems and methods for code communication are provided. A secure system wirelessly transmits, via a magnetic field transmitter, an access code to a handheld wireless communication device as a sequence of polarities of a short-range magnetic field. The wireless communication device senses the sequence of polarities and determines the code from the sensed sequence of polarities. The code provides access to the secure system. The handheld wireless communication device can wirelessly transmit the code received from the short-range magnetic field and identification information to the secure system to receive access to the secure system. The access is personalized based on at least the identification information and is maintained or validated when the handheld wireless communication device is within range of the short-range magnetic field.

16 Claims, 6 Drawing Sheets

(56) References Cited

U.S. PATENT DOCUMENTS

| | | | |
|---|---|---|---|
| 2008/0017721 A1* | 1/2008 | Zehnacker | 235/493 |
| 2009/0251279 A1* | 10/2009 | Spangenberg et al. | 340/5.7 |
| 2010/0328231 A1* | 12/2010 | Pasquero et al. | 345/173 |
| 2012/0071090 A1* | 3/2012 | Charrat et al. | 455/41.1 |
| 2012/0280035 A1* | 11/2012 | Liu et al. | 235/380 |
| 2012/0313626 A1* | 12/2012 | Cattin et al. | 324/207.13 |
| 2013/0244700 A1* | 9/2013 | Elias | 455/456.6 |

* cited by examiner

SYSTEM AND METHOD FOR CODE COMMUNICATION

BACKGROUND

Many phone applications require a user to enter a token, secret key, or password in order to operate in a secure and private environment. However, the manual entry into a phone application can be tedious, error prone and difficult for some users.

Generally, some automatic transfer methods exist such as near field communication (NFC). However, such a technique would use an NFC transceiver which is typically not used with smartphones since they are must be added as an extra component to the smartphone. Furthermore, adding an NFC transceiver can be take up valuable real estate in the smartphone because the NFC transceiver is relatively large, requires an extra battery (e.g., a dedicated battery), and raises particular positioning issues in the smartphone. Another automatic transfer technique such as using quick response (QR) codes are available for some phones with cameras; however, QR codes are fiddly to use and can be compromised by bright lighting, for example, that can make the QR codes unreadable or unreliable.

Further limitations and disadvantages of conventional and traditional approaches will become apparent to one of skill in the art through the comparison of such systems with some aspects of some embodiments according to the present invention as set forth in the remainder of the present application with reference to the drawings.

BRIEF SUMMARY

Aspects of the disclosure relate to systems and methods for code communication.

An example embodiment provides a method for a code communication. The method include, for example, one or more of the following: sensing, by at least a magnetic sensor of a handheld wireless communication device, a sequence of polarities of a short-range magnetic field; determining, by a processor of the handheld wireless communication device, a code from the sensed sequence of polarities, wherein the code provides access to a secure system; transmitting, by the handheld wireless communication device, the code received from the short-range magnetic field and identification information to the secure system via a radio communication to receive access to the secure system, wherein the access is personalized based on at least the identification information; and maintaining or validating the access to the secure system when handheld wireless communication device is within range of the short-range magnetic field.

An example embodiment provides a wireless communication device. The wireless communication device includes, for example, one or more memories, a digital compass, and one or more processors. The digital compass can be configured to sense a sequence of polarities of a short-range magnetic field. The one or more processors can be operatively coupled to the one or more memories. The one or more processors can be configured to determine a code from the sensed sequence of polarities in which the code provides access to a secure system. The one or more processors can be configured to wirelessly transmit the code received from the short-range magnetic field and identification information to the secure system to receive access to the secure system. The access can be personalized based on at least the identification information and can be maintained or validated when the wireless communication device is within range of the short-range magnetic field.

An example embodiment provides a cellular phone. The cellular phone can include, for example, one or more memories, a digital magnetic sensor, and one or more processors. The digital magnetic sensor can be configured to sense a sequence of polarities of a short-range magnetic field. The one or more processors can be operatively coupled to the one or more memories. The one or more processors can be configured to determine a code from the sensed sequence of polarities in which the code provides access to a secure system. The one or more processors can be configured to wirelessly transmit the code received from the short-range magnetic field and identification information to the secure system to receive access to the secure system. The access to the secure system can be maintained or validated when the cellular phone is within range of the short-range magnetic field and can be personalized based on at least the identification information.

These and other advantages, aspects and novel features of the present invention, as well as details of an illustrated embodiment thereof, will be more fully understood from the following description and drawings.

DETAILED DESCRIPTION

Aspects of the disclosure relate to systems and methods for code communication.

Figure 1:
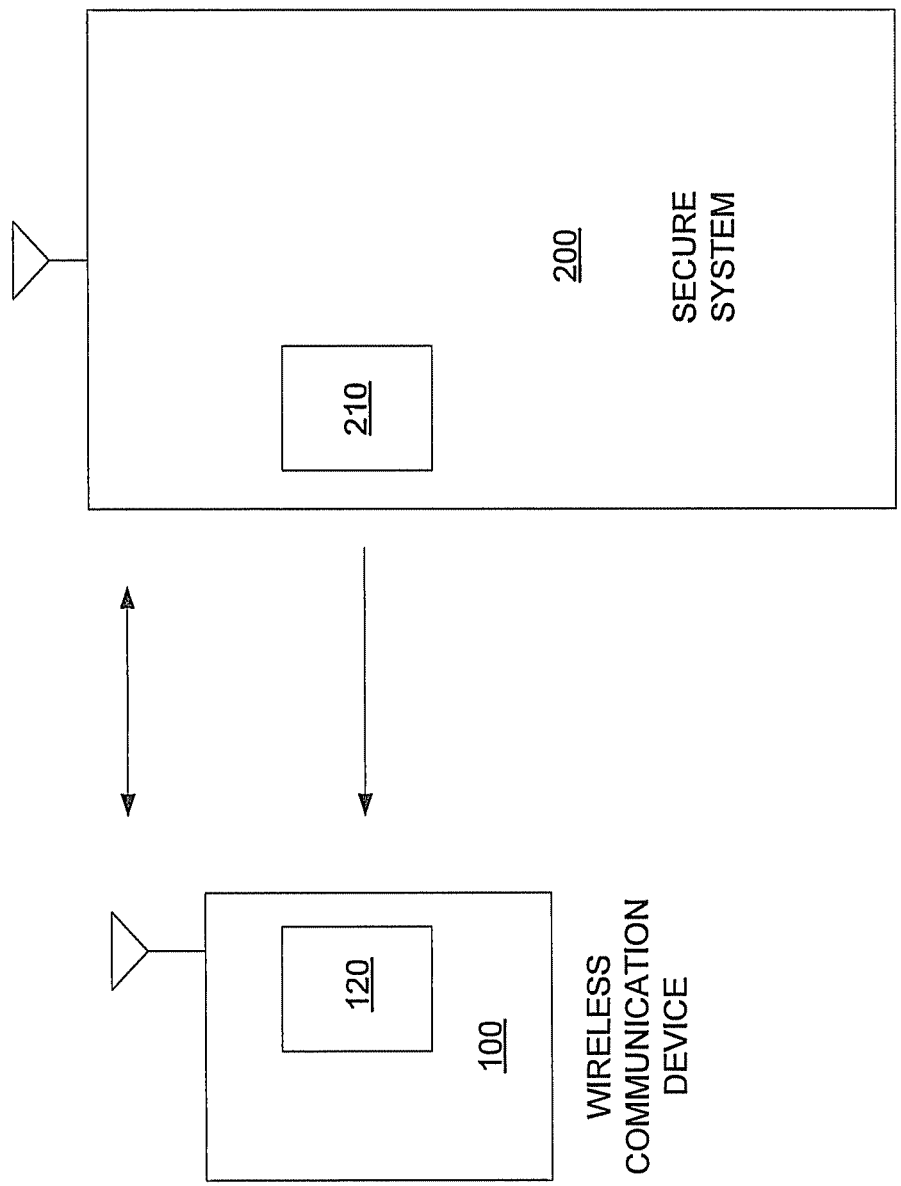
FIG. 1 shows an example embodiment of a wireless communication device in communication with a secure system.

FIG. 1 shows an example embodiment of a wireless communication device 100 that is in communication with a system 200 (e.g., a secure system). The wireless communication device 100 can be, for example, a handheld wireless communication device, a mobile phone, a cellular phone, a smartphone, a computing tablet, a personal digital assistant (PDA), etc. The wireless communication device 100 can include, for example, a magnetic sensor 120. The magnetic sensor 120 can be, for example, a digital compass, a magnetometer, etc. The secure system 200 can include, for example, a magnetic field transmitter 210. The secure system 200 can be, for example, a secure device, a secure computer, a secure room or location, a secure application, etc.

In an example embodiment, the magnetic sensor 120 is configured to sense in three-dimensions such as a three-dimensional compass or magnetometer. The three-dimensional compass or magnetometer is accurate and can be found in existing phones (e.g., smartphones).

In operation, the secure system 200 can be accessed if a particular code is received. In an example embodiment, the particular code can be, for example, a token, a key, a password, etc. In another example embodiment, the particular code can be used for encoding a URL, contact information, a calendar event, a token, a key, a password, etc. The secure system 200 can transmit the particular code using the magnetic field transmitter 210. In an example embodiment, the magnetic field transmitter 210 changes the magnetic field around the magnetic field transmitter 210 for limited distances (e.g., short distances). In an example embodiment, the limited distances are less than a meter. In an example embodiment, the magnetic field transmitter 210 can modulate the particular code as a sequence of magnetic field polarities (e.g., north (N) and south (S)). The sequence can be sent periodically or can be event-triggered (e.g., when a user interface on the secure system 200 is activated or when the wireless communication device 100 is in proximity). In an example embodiment, proximity can be determine by signal strength (e.g., wireless RSSI), ultrasound, lighting, etc.

In an example embodiment, the magnetic field transmitter 210 can send a sequence of magnetic field polarities. In an example embodiment, the magnetic field transmitter 210 can send a sequence of changes in magnetic field polarity.

The wireless communication device 100 has the magnetic sensor 120 that can sense the changing magnetic field. In an example embodiment, the magnetic sensor 120 can sense the sequence of magnetic field polarities. In an example embodiment, the magnetic sensor 120 can sense a sequence of magnetic polarity changes.

Figure 2:
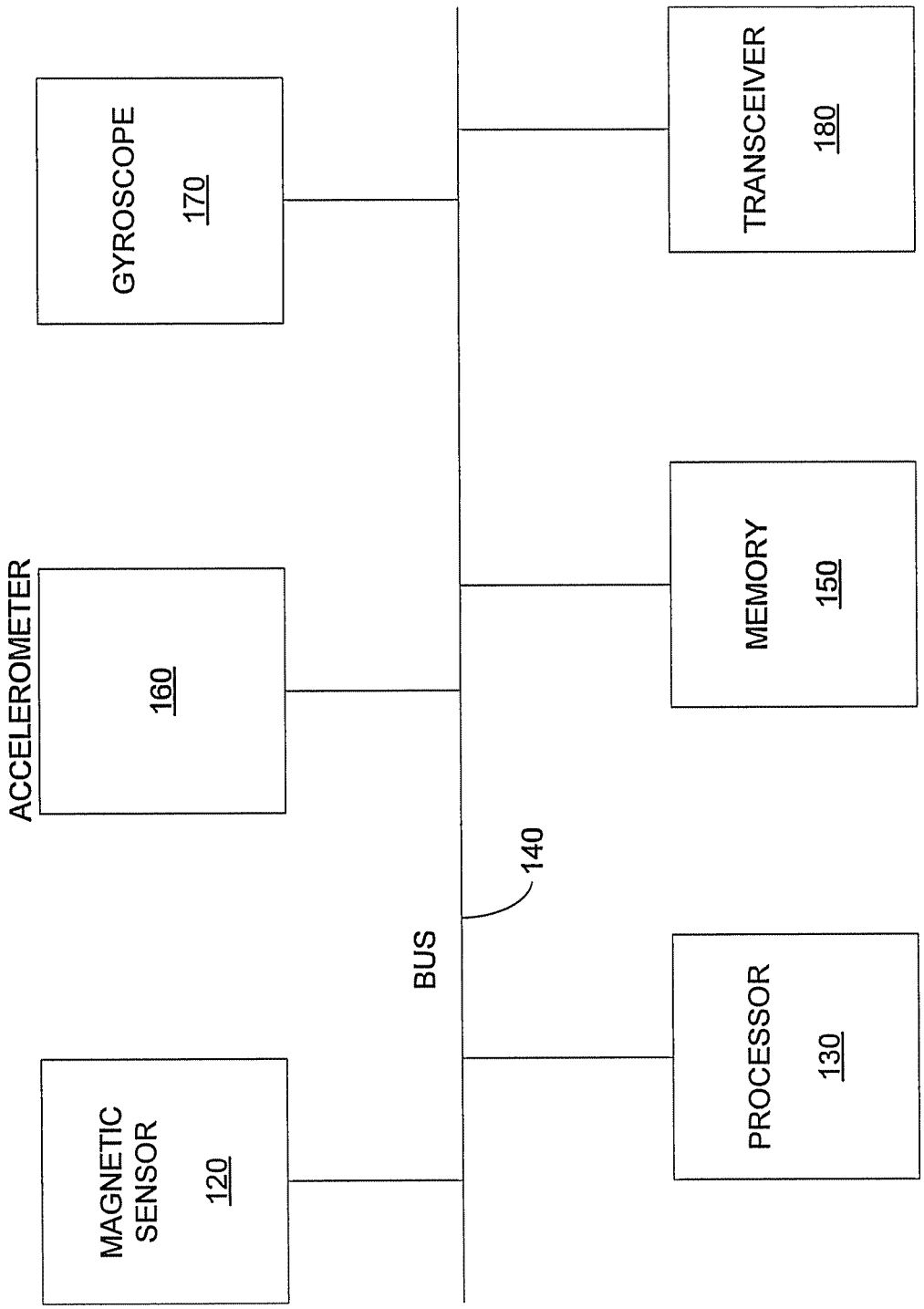
FIG. 2 shows an example embodiment of some components of the wireless communication device.

FIG. 2 shows a block diagram of some components of wireless communication device 100 according to an example embodiment. Referring to FIG. 2, the magnetic field transmitter 210, one or more processors 130, an accelerometer 160, a gyroscope 170, one or more memories 150 and one or more transceivers 180 can be coupled to the bus 140. In an example embodiment, a portion of the memory 150 can be internal with respect to processor 130 in the form of an internal cache, for example. The processor 130 and/or the memory 150 (e.g., a non-transitory computer readable media, RAM, ROM, etc.) can store software, firmware, instructions and/or code that are executable, at least in part, by the processor 130. In an example embodiment, the transceiver 180 can be configured to support, for example, one or more of the following via one or more antennas: Bluetooth communication, wireless local area network communication, radio communication, and cellular communication.

In operation, the magnetic sensor 120 can sense the sequence of magnetic field polarities and send the sensed sequence of magnetic field polarities to the processor 130 for further processing. In an example embodiment, the magnetic sensor 120 is a digital magnetic sensor 120 that can convert the sensed sequence of magnetic field polarities into binary data signals. In another example embodiment, the processor 130 can determine the corresponding binary data signals from the sensed sequence of magnetic field polarities. In an example embodiment, the gyroscope 170 and/or the accelerometer 160 can assist the magnetic sensor 120 and/or the processor 130 to determine the magnetic field polarities by providing information about, for example, one or more of the following: the orientation (e.g., position, tilt, etc.) of the wireless communication device 100 and/or the magnetic sensor 120, the change in orientation (e.g., velocity, angular velocity, etc.) and/or the change in the change of the orientation (e.g., acceleration, angular acceleration, etc.). In an example embodiment, the secure system 200 can provide a surface (e.g., a surface of a podium) and ask the user to place the wireless communication device 100 in a certain position to accurately receive the code conveyed in the magnetic field.

The binary data signals can include, for example, a particular code that can be used to access the secure system 200. In an example embodiment, the particular code can be used to access secure applications or secure portions of applications (e.g., secure data) in the secure system 200 and/or the wireless communication device 100. In other example embodiments, the particular code can be used to open locked doors or locked systems. In yet other example embodiments, the particular code can be used with other information residing in the secure system 200 and/or the wireless communication device 100 to personalize output information (e.g., visual displays, audio outputs, etc.).

The binary data signals can be encoded and/or encrypted. In an example embodiment, the processor 130 can decode and/or decrypt the encoded and/or encrypted data information to determine the particular code that is encoded and/or encrypted in the binary data signals.

The binary data signals can include error correction mechanisms (e.g., error correction codes, parity bits, redundant data techniques, interleaving, etc.). Thus, errors in the data can be recovered using the error correction mechanisms by, for example, the processor 130.

In an example embodiment, the particular code can be, for example, displayed on the wireless communication device 100. A user of the wireless communication device 100 can, for example, enter the particular code or another code derived from the particular code into a user interface 240 (e.g., touch screen display, keyboard, keypad, microphone, etc.) of the secure system 200 to gain access to the secure system 200.

In an example embodiment, the particular code can be included in a wireless communication back to the secure system 200. The particular code can be appended as a parameter to a URL that is sent to the secure system 200 (e.g., a cloud service in communication with or part of the secure system 200).

Figure 3:
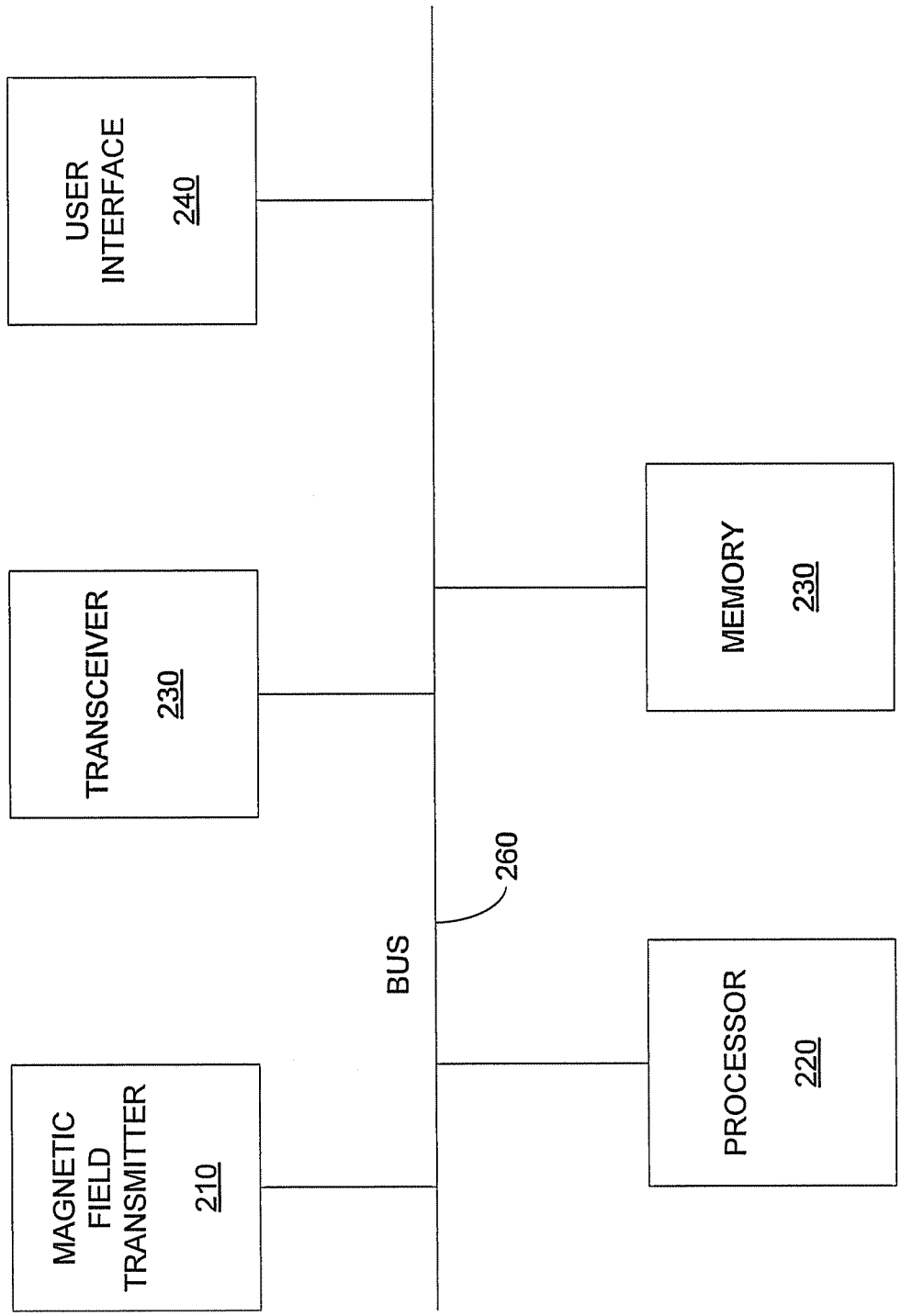
FIG. 3 shows an example embodiment of some components of the secure system.

FIG. 3 shows a block diagram of some components of the secure system 200 in according to an example embodiment. Referring to FIG. 3, the magnetic field transmitter 210, one or more processors 220, one or more memories 230, one or more transceivers 240, and one or more user interfaces 250 are coupled to one or more buses 260. In an example embodiment, a portion of the memory 230 can be internal with respect to processor 220 in the form of an internal cache, for example. The processor 220 and/or the memory 230 (e.g., a non-transitory computer readable media, RAM, ROM, etc.) can store software, firmware, instructions and/or code that are executable, at least in part, by the processor 220. In an example embodiment, the transceiver 230 can be configured to support, for example, one or more of the following via one or more antennas: Bluetooth communication, wireless local area network communication, radio communication, and cellular communication.

In an example embodiment, the particular code stored, for example, in the processor 220 and/or the memory 230 can be transmitted by the secure system 100 through the magnetic field transmitter 210 to the magnetic sensor 120 of the wireless communication device 100. The wireless communication device 100 can then transmit the particular code or a code derived on the particular code (e.g., a corresponding or associated code or a processed code) through the transceiver 180 of the wireless communication device 100 to the transceiver 230 of the secure system 200. The processor 220 can then determine whether the particular code received via the transceiver 230 is an acceptable code that provides access to the secure system 200. In an example embodiment, the acceptable code matches the code that was just sent over via the magnetic field transmitter 210.

In an example embodiment, the access to the secure system 200 is only available while the wireless communication device 100 is in communication with the secure system 200. In particular, if the wireless communication device 100 is using a short-range wireless communication protocol to communicate the particular code with the secure system 200, access to the secure system 200 can be withdrawn if the wireless device 100 moves out of communication range of the transceivers 180, 230. Thus, an extra measure of security can be provided in that access is no longer granted to the secure system 200 if the user leaves with the wireless communication device 100. In an example embodiment, the code transmitted by the secure system 200 can be changed periodically into a new magnetic sequence and thus the wireless communication device 100 that has moved out of range would still be using the old sequence and its communication would be invalidated. In an example embodiment, if access to a computer is granted, the access will be withdrawn if the user leaves with the wireless communication device 100. This would prevent, for example, another user from using the previous user's access to the secure computer. Thus, in an example embodiment, even if the previous user has logged on to the computer with a particular username and password, access is further contingent on the wireless communication device 100 of the user being there. Thus, a second level of security is provided in addition to a first level of authorization (e.g., username and password).

In an embodiment, the magnetic field transmitter 210 can be configured to be a short-range transmitter. Thus, the wireless communication device 100 receives the particular code contained in the magnetic field generated by the magnetic field transmitter 210 while the wireless communication device 100 is within the short range of the magnetic field transmitter 210. In an example embodiment, the particular code being sent by the magnetic field transmitter 210 can change with time (e.g., periodically) so that if an outdated (e.g., expired) code is received by the secure system 100 through the transceiver 230 and/or the user interface 240, then the processor 220 can withdraw access to the secure system 100 until the most recent code is received. In an example embodiment, the particular code being sent by the magnetic field transmitter 210 can be changed after a predetermined number of messages (e.g., change every message or every two messages sent or received by the secure system 200, etc.) Thus, an extra measure of security can be provided in that access is no longer granted to the secure system 200 if the user leaves with the wireless communication 100 (e.g., wanders outside the limited-range of the magnetic transmitter 210) since, after a predetermined amount of time, an updated code will need to be received if access to the secure system 200 is to be maintained.

In an example embodiment, a first magnetic field transceiver is used instead of or in addition to the magnetic field transmitter 210; and a second magnetic field transceiver is used instead of or in addition to the magnetic sensor 120. Thus, the secure system 200 and the wireless communication device 100 can be configured for two-way magnetic communication. The magnetic field transceivers can be configured for short-range communication. Thus, in an example embodiment, access to a secure system 200 is provided when the two magnetic field transceivers are in communication and are able, for example, to communicate the particular code that grants access to the secure system 200. In another example, access to the secure system 200 can only be provided if the two magnetic field transceivers are in communication. If the two magnetic field transceivers are not in communication and the secure system 200 does not receive the expected code (e.g., received code is outdated or expired), then access to the secure system 200 can be withdrawn.

Figure 4:
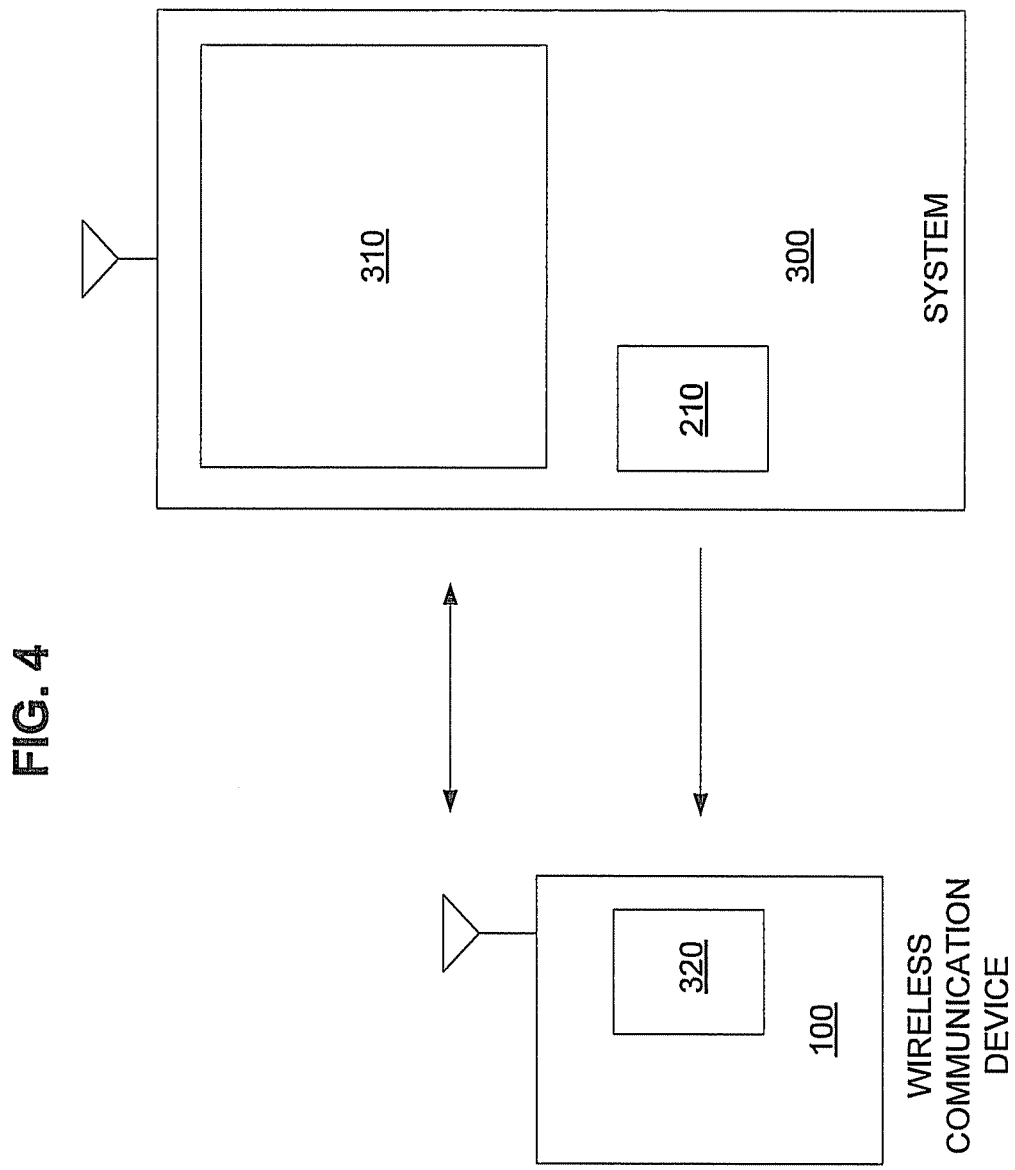
FIG. 4 shows an example embodiment of the wireless communication device in communication with a system with a display.

Referring to FIG. 4, the wireless communication device 100 is receiving a magnetic communication from a system 300 with a display 310 in accordance with an example embodiment. The display 310 can be, for example, public signage, a display on a computer screen, etc. The display can also be audio and/or visual, for example.

In operation, the wireless communication device 100 receives, via the magnetic sensor 120, the particular code from the magnetic field transmitter 210 of the system 300. The wireless communication device 100 transmits the particular code and other identifying information to the system 300. The identifying information can be, for example, about the user and/or the wireless communication device 100. The wireless communication device 100 can transmit the particular code and other identifying information to the system 300 using magnetic communication or other types of wireless communication (e.g., Bluetooth communication, wireless local area network communication, radio communication, and cellular communication).

Upon receiving the identifying information or other control information from the wireless communication device 100, the system 300 can personalize the display 310 to reflect the identity of the user, for example. Thus, for example, the display 310 can provide advertisements that reflect the tastes or interests of the user of the wireless communication device 100. In an example embodiment, the wireless communication device 100 can be used to control the display 310. For example, the wireless communication device 100 can be used to navigate the display (e.g., navigate through an advertisement to a particular car, other interests, or other digital content).

The system 300 can also display information on the display 320 of the wireless communication device 100 such that the wireless communication device 100 can control the display 320 and/or the display 310.

In an example embodiment, the system 300 and the wireless communication device 100 are associated with each other when the system 300 and the wireless communication device 100 are within range of the magnetic field transmitter 210 and the magnetic sensor 120 such that the wireless communication device 100 can receive the particular code (e.g., a time-varying code).

In an example embodiment, the system 300 is a kiosk that sells or rents digital content such as movies or music in physical form (e.g., a DVD or CD) or as a digital file that can be downloaded onto the wireless communication device 100. The kiosk 300 sends out a particular code on the magnetic field generated by the magnetic field transmitter 210. If the magnetic field transmitter 210 is configured for short-range transmission, the wireless communication device 100 can receive the particular code via its magnetic sensor 120 if within the short range. The wireless communication device 100 can then send, via its transceiver 180 (e.g., radio transceiver), the particular code and identifying information to the kiosk.

Upon receiving the particular code, the kiosk can provide access to the digital content that the kiosk sells or rents. The identifying information received via the transceiver 230 (e.g., radio transceiver) can be used to personalize the selections of digital content for sale or rent on the display 310 of the system 300. In an example embodiment, the identifying information received via the transceiver 230 can be used to personalize the selections of digital content for sale or rent on the display 320 of the wireless communication device 100.

The wireless communication device 100 or a user interface on the system 300 (e.g., on the display 310) can be used to control the displayed choices to facilitate the user selects particular digital content to rent or to buy. The purchase or rental can be facilitated by the kiosk providing the CD or DVD, or by the wireless communication device 100 downloading the digital content from the system 300 using the transceivers 180, 320. Once the user leaves, the personalized access to the kiosk is withdrawn since the system 300 no longer receives the particular code and/or the identifying information from the wireless communication device 100. An example embodiment can provide that all access to the kiosk session can be blocked after the wireless communication device 100 has left the vicinity of the kiosk, thereby preventing subsequent users or passersby from accidentally or maliciously interfering with the kiosk session (e.g., the kiosk session of the previous wireless communication device 100).

In an example embodiment, magnetic field transceivers in the wireless communication device 100 and the system 300 can be used for the dedicated communication of the particular code while the other transceivers 180, 230 (e.g., radio transceivers) can be used for the communication of other types of data (e.g., identifying information about the user, digital content, control information, etc.)

Figure 5:
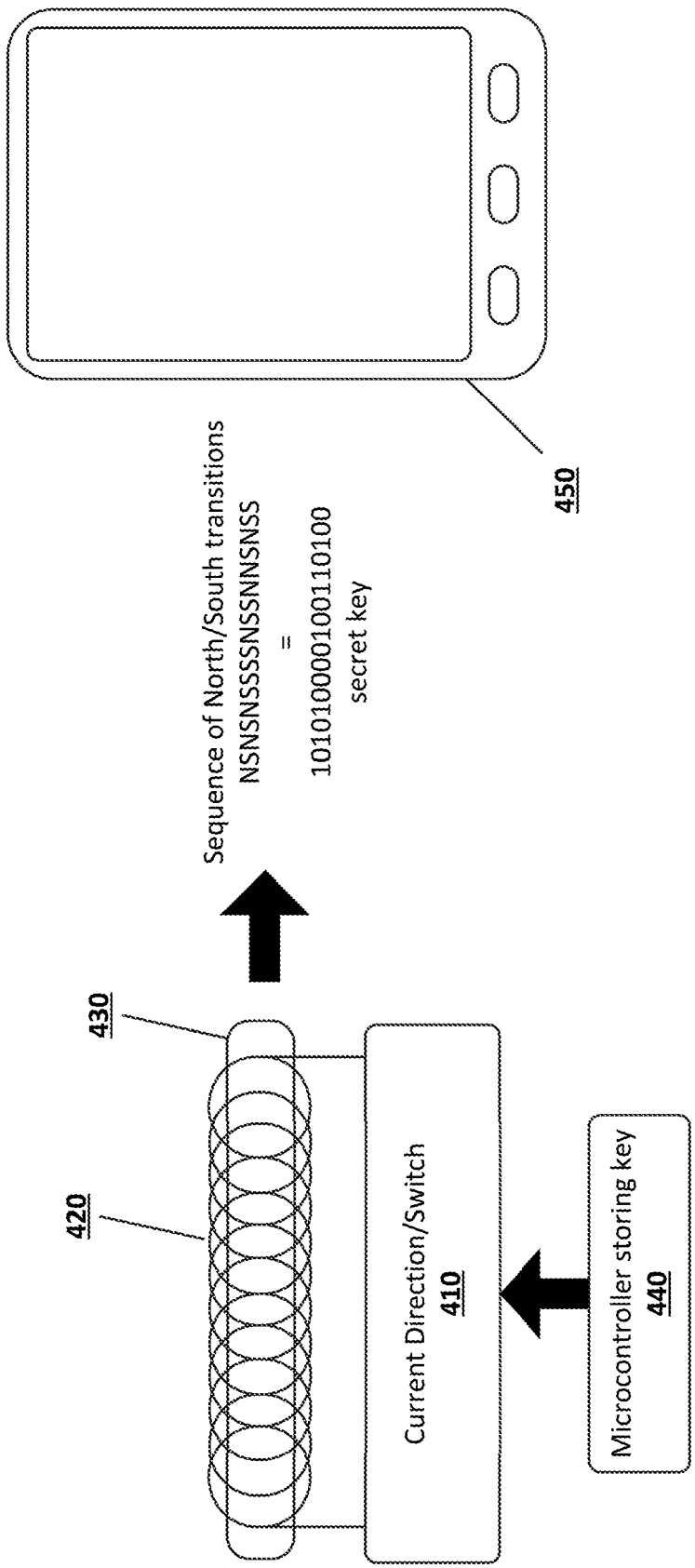
FIG. 5 shows an example embodiment of a magnetic field transmitter arrangement in communication with the wireless communication device.

FIG. 5 shows an example embodiment of the magnetic field transmitter 210 transmitting, for example, a secret key to the wireless communication device. Referring to FIG. 5, the system 200, 300 can include the magnetic field transmitter 210 that includes a current controller 410. The current controller 410 can be coupled to one or more wires 420. The wire 420 can be coiled around a magnet 430. The current controller 410 can be configured to control the current direction and intensity that flows through the wire 420. In an example embodiment, a microcontroller 440 (e.g., a processor) can be coupled to the current controller 420 and can be configured to provide a secret key to the current controller 410. In an example embodiment, the microcontroller 440 can be coupled to the current controller 420 and can be configured to provide control signals to the current controller 410 which can have the effect of conveying the secret key as a sequence of polarity changes in a magnetic signal.

In an example embodiment, the current controller 420 and/or the microcontroller 440 can be configured to convert the secret key into various current directions and intensities to generate a corresponding changing magnetic field. By controlling the current direction, for example, the polarity of the transmitted magnetic field can be controlled. By controlling the current intensities, for example, the strength of the transmitted magnetic field can be changed.

The wireless communication device 450 can detect the changing magnetic field using an internal compass (e.g., the magnetic field sensor 120). By detecting the changes in the magnetic field (e.g., the changes in polarities of the magnetic field), the wireless communication device 450 can recover the secret key.

In an example embodiment, a first polarity such as North (N) can be used to represent a first binary digit (e.g., "1"); and a second polarity such as a South (S) can be used to represent a second binary digit (e.g., "0"). Thus, for example, a secret key encoded by SSSSNSNSNSSNSSSN can be used to represent 0x0A91 as a hexadecimal number.

Figure 6:
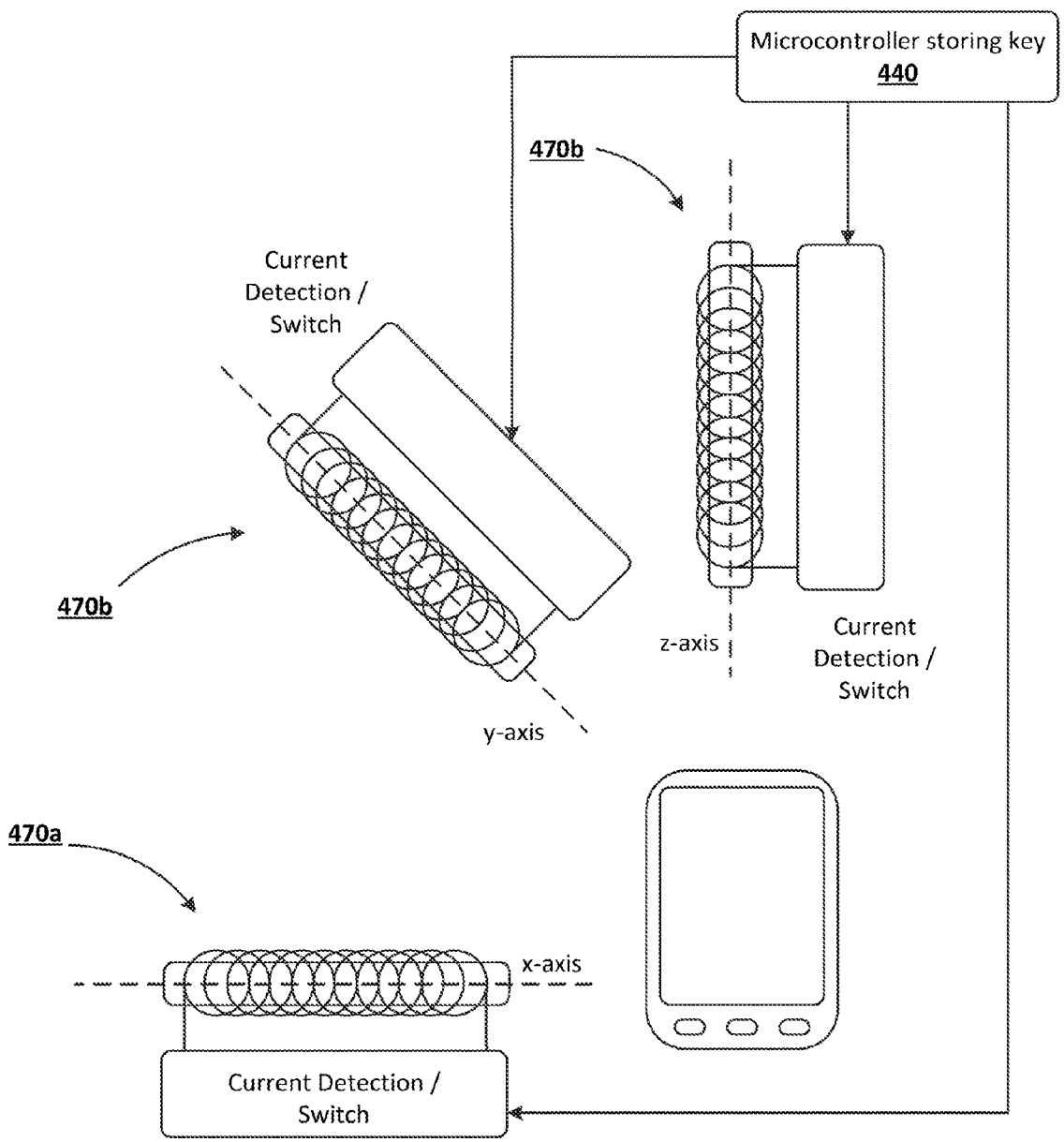
FIG. 6 shows an example embodiment of a three-dimensional magnetic field transmitter arrangement in communication with the wireless communication device.

FIG. 6 shows an example embodiment that can be used to improve the data rate. An example embodiment contemplates that, instead of or in addition to merely polarities N or S to encode the secret key, other degrees of freedom be used to add more symbols to represent each bit of the secret key.

Referring to FIG. 6, three magnetic transmitter arrangements 470*a-c* are deployed in the system 300 to extend the data rate. The microcontroller 440 is operatively coupled to the three magnetic transmitter arrangements and provides the secret key the magnetic transmitter arrangements 470*a-c*. Thus, instead of just the symbols N and S to encode each bit of the secret key, the symbols $N_x$, $N_y$, $N_z$, $S_x$, $S_y$ and $S_z$ can be used to encode each bit of the secret key. In an example embodiment, a digital compass can be configured to provide three-dimensional magnetic field detection. In an example embodiment, the digital compass can be configured to measure three independent (e.g., orthogonal) axes of a three-dimensional magnetic field and thus sense all six of these symbols.

In another example embodiment, in addition to the symbols $N_x$, $N_y$, $N_z$, $S_x$, $S_y$ and $S_z$, intensities values (e.g., amplitude values) can be used to further extend the data rate (e.g., ½ $N_x$, $N_x$, ½ $N_y$, $N_y$, etc.)

In some example embodiments, magnetic directions and intensities (e.g., amplitudes) can be encoded by other types of coordinate systems such as, for example, spherical coordinates (e.g., radius, azimuth angle, and zenith angle). In an example embodiment using spherical coordinates, the coordinates can be further split into 2, 12, and 6 elements, respectively, to stay within the resolution of some magnetic sensors 120. Thus, such a division achieves 144 symbols per bit, thereby increasing the binary bit rate by 72.

In an example embodiment, a data payload of symbols can be check summed to detect bit errors. In an example embodiment, the erroneous bits or a corrupted payload can be dropped or recovered. Error detection and/or error correction techniques can be employed.

In an example embodiment, bit stuffing and other data transport techniques can be employed as markers in the payload (e.g., a beginning marker).

The use of the three dimensional approach to encoding and detecting secret keys in magnetic fields provides, in some example embodiments, additional spatial security since a predetermined point in space can be designated where the wireless communication device 100 is to be placed to detect the magnetic fields and to receive information.

Systems and methods for code communication are provided. A secure system wirelessly transmits, via a magnetic field transmitter, an access code to a handheld wireless communication device as a sequence of polarities of a short-range magnetic field. The wireless communication device senses the sequence of polarities and determines the code from the sensed sequence of polarities. The code (e.g., ephemeral code) provides credentials to access the secure system. The handheld wireless communication device can wirelessly transmit the code received from the short-range magnetic field and identification information to the secure system to gain access to the secure system. The access is personalized based on at least the identification information and is maintained when the handheld wireless communication device is within range of the short-range magnetic field.

While the present method and apparatus has been described with reference to certain embodiments, it will be understood by those skilled in the art that various changes may be made and equivalents may be substituted without departing from the scope of the present method and apparatus. In addition, many modifications may be made to adapt a particular situation or material to the teachings of the present disclosure without departing from its scope. Therefore, it is intended that the present method and apparatus not be limited to the particular embodiment disclosed, but that the present method and apparatus will include all embodiments falling within the scope of the appended claims.

What is claimed is:

1. A method for code communication, comprising:
sensing, by at least a magnetic sensor of a handheld wireless communication device, a sequence of polarities of a short-range magnetic field;
determining, by a processor of the handheld wireless communication device, a code from the sensed sequence of polarities, wherein the code provides access to a secure system and each bit of the code is represented by at least six different symbols, each symbol representing a respective polarity and a respective one of at least three dimensions of the magnetic field;
transmitting, by the handheld wireless communication device, the code received from the short-range magnetic field and identification information to the secure system via a radio communication to receive access to the secure system, wherein the access is personalized based on at least the identification information; and
maintaining or validating the access to the secure system when handheld wireless communication device is within range of the short-range magnetic field.

2. The method according to claim 1, wherein each bit of the code is represented by a plurality of symbols, wherein each symbol represents at least a respective polarity, a respective direction, and a respective amplitude of the magnetic field.

3. The method according to claim 1, wherein the magnetic sensor includes a compass or magnetometer.

4. The method according to claim 1, wherein the magnetic sensor includes a compass that can sense the sequence of polarities in at least three dimensions.

5. The method according to claim 1, wherein the identification information is used to provide personalized information on a display of the secure system.

6. The method according to claim 1, wherein the handheld wireless communication device comprises a cellular phone.

7. The method according to claim 1, wherein the secure system comprises one or more of the following: a secure location with a physical lock, a computer station, a kiosk, a digital display, and a sign.

8. The method according to claim 1, wherein the code changes after a predetermined amount of time.

9. A wireless communication device, comprising:
one or more memories;
a digital compass configured to sense a sequence of polarities of a short-range magnetic field; and
one or more processors operatively coupled to the one or more memories, wherein the one or more processors are configured to determine a code from the sensed sequence of polarities, wherein the code provides access to a secure system and each bit of the code is represented by at least six different symbols, each symbol representing a respective polarity and a respective one of at least three dimensions of the magnetic field, wherein the one or more processors are configured to wirelessly transmit the code received from the short-range magnetic field and identification information to the secure system to receive access to the secure system, wherein the access is personalized based on at least the identification information and is maintained or validated when the wireless communication device is within range of the short-range magnetic field.

10. The wireless communication device according to claim 9, wherein the wireless communication device is a smartphone or a cellular phone.

11. The wireless communication device according to claim 9, wherein each bit of the code is represented by a plurality of symbols, wherein each symbol represents at least a respective polarity, a respective direction and a respective amplitude of the magnetic field.

12. The wireless communication device according to claim 9, wherein the digital compass is configured to sense the sequence of polarities in three dimensions.

13. The wireless communication device according to claim 9, wherein the wireless transmission of the code and the identification information uses one or more of the following: Bluetooth communication, wireless local area network communication, radio communication, and cellular communication.

14. The wireless communication device according to claim 9, wherein the identification information is used to provide personalized information on a display of the secure system.

15. The wireless communication device according to claim 9, wherein the secure system comprises one or more of the following: a secure location with a physical lock, a computer station, a kiosk, a digital display, and a sign.

16. A cellular phone, comprising:
one or more memories;
a digital magnetic sensor configured to sense a sequence of polarities of a short-range magnetic field; and
one or more processors operatively coupled to the one or more memories, wherein the one or more processors are configured to determine a code from the sensed sequence of polarities, wherein the code provides access to a secure system and each bit of the code is represented by at least six different symbols, each symbol representing a respective polarity and a respective one of at least three dimensions of the magnetic field, wherein the one or more processors are configured to wirelessly transmit the code received from the short-range magnetic field and identification information to the secure system to receive access to the secure system, wherein the access to the secure system is maintained or validated when the cellular phone is within range of the short-range magnetic field and is personalized based on at least the identification information.

* * * * *